(12) United States Patent
Amlekar et al.

(10) Patent No.: US 9,354,976 B2
(45) Date of Patent: May 31, 2016

(54) LOCATING PREVIOUS VERSIONS OF AN OBJECT IN A STORAGE CLUSTER

(71) Applicant: NetApp, Inc.

(72) Inventors: Shekhar A. Amlekar, Nagpur (IN); Ankit Mathur, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 497 days.

(21) Appl. No.: 13/791,382

(22) Filed: Mar. 8, 2013

(65) Prior Publication Data

US 2014/0258239 A1    Sep. 11, 2014

(51) Int. Cl.
*G06F 17/30* (2006.01)
*G06F 11/14* (2006.01)
*G06F 11/00* (2006.01)

(52) U.S. Cl.
CPC .......... *G06F 11/1402* (2013.01); *G06F 11/006* (2013.01); *G06F 11/1469* (2013.01); *G06F 17/30* (2013.01); *G06F 2201/835* (2013.01)

(58) Field of Classification Search
None
See application file for complete search history.

(56) References Cited

U.S. PATENT DOCUMENTS

| 7,529,778 | B1 * | 5/2009 | Dewey et al. | |
| 8,364,639 | B1 * | 1/2013 | Koryakina et al. | 707/639 |
| 2008/0059541 | A1 * | 3/2008 | Fachan et al. | 707/204 |
| 2010/0114889 | A1 * | 5/2010 | Rabii | G06F 17/30197 707/737 |
| 2013/0091105 | A1 * | 4/2013 | Bhave et al. | 707/693 |
| 2014/0250075 | A1 * | 9/2014 | Broido et al. | 707/639 |

* cited by examiner

*Primary Examiner* — Jay Morrison
(74) *Attorney, Agent, or Firm* — Kilpatrick Townsend & Stockton LLP

(57) ABSTRACT

Technology for accessing previous versions of data objects within a storage cluster including multiple storage volumes under a common namespace is disclosed herein. In some embodiments, the network storage cluster having multiple cooperative storage nodes receives a namespace identifier for a previous version of a data object. The namespace identifier includes a namespace path containing a volume junction and a time indicator indicating a point in time when the previous version of the data object existed. The network storage cluster identifies a storage volume within the network storage cluster using the volume junction. The volume junction points to a root directory of a file system of the storage volume. The network storage cluster locates, based on the namespace path, the previous version of the data object within a snapshot copy of the storage volume, wherein the snapshot copy is identified by the time indicator.

20 Claims, 6 Drawing Sheets

US 9,354,976 B2

LOCATING PREVIOUS VERSIONS OF AN OBJECT IN A STORAGE CLUSTER

BACKGROUND

Snapshotting is a technique to preserve the state or the data of a storage system at a particular point in time. A "snapshot copy" is a point-in-time image of a set of data. Computer systems can employ a snapshotting mechanism to backup data stored in the storage components of the computer system.

Storage servers commonly employ the snapshotting mechanism for backup of the storage volumes of the storage servers. A storage server is a processing system that provides one or more storage clients with access (e.g., read and write access) to a mass storage facility over a network. Such a system is called a network storage system. A "volume" is a logical data set which is an abstraction of physical storage, combining one or more physical mass storage devices (e.g., disks) or parts thereof into a single logical storage object, and which is managed as a single administrative unit, such as a single file system. A volume may be defined from a larger group of available storage, such as an aggregate. A volume may be logically broken down into logical data sets (storage objects) called "plexes", which may contain one or more RAID groups.

A storage server may provide a "Previous Version" feature as a way for a client to view and restore previous versions of files and directories that are maintained in volume snapshot copies. However, such "Previous Version" feature is very difficult to implement in a clustered storage system that includes multiple storage nodes and multiple file systems of volumes residing on different storage nodes.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

Figure 1:
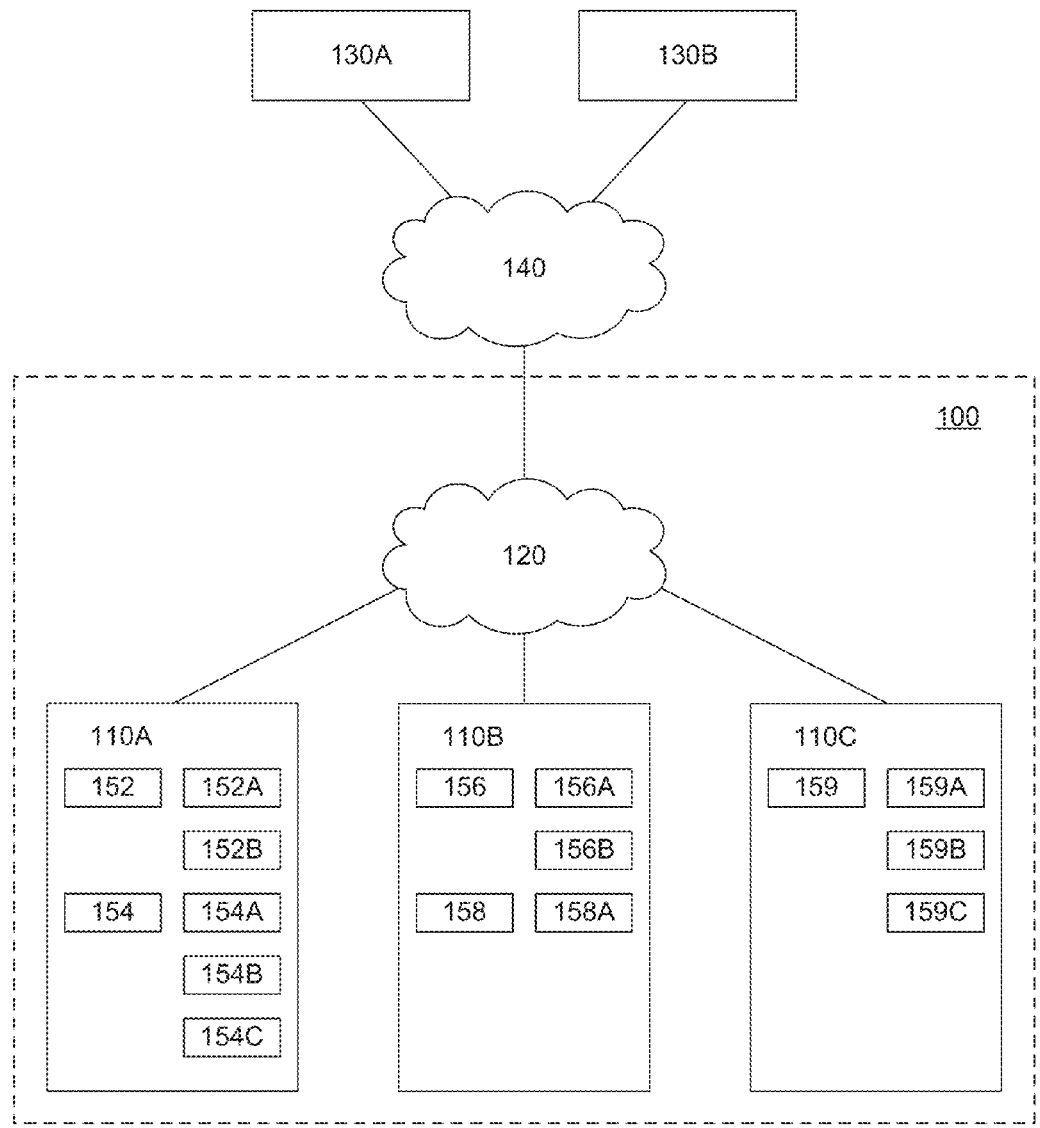
FIG. 1 is a block diagram illustrating an example of a network storage cluster.

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Technology for accessing previous versions of data objects within a clustered storage system that includes multiple storage volumes under a single common (shared) namespace is disclosed herein. The file systems of the storage volumes include objects of a special type, called "volume junctions", which point to root directories of files systems of other storage volumes. A "namespace" as discussed herein is a logical grouping of unique identifiers of a set of logical containers of data, such as volumes. A "file system" as discussed herein is a structured set of logical containers of data, which may be, but are not necessarily, in the form of files, directories, logical units and/or other type(s) of logical containers. Via the volume junctions, the files systems of the storage volumes form the single common namespace that can be employed to locate any data object within the storage system, even where the volumes containing the data are stored in different file systems distributed across multiple nodes of a storage cluster.

The storage system can receive a namespace identifier including a namespace path and a timestamp for accessing a previous version of a data object. Based on the namespace path including volume junctions, the storage system can identify the storage volume that stores the data object. Based on the timestamp, the storage system can further identify the snapshot copy of the storage volume that stores the previous version of the data object. Once the previous version of the data object is located, the storage system can restore the previous version of the data object as the current version of the data object in the storage volume, or send the content of the previous version of the data object to a client device.

The common namespace can be used to locate a current or previous version of a data object residing on any of the storage volumes, which may be stored in different nodes of a storage cluster. The storage system is able to select a proper snapshot copy of the volume to locate the requested previous version of the data object. Furthermore, using the volume junctions, the storage system can restore data object within a portion (e.g. a directory) of the common namespace across snapshot copies of multiple storage volumes.

In accordance with the techniques introduced here, therefore, a network storage cluster capable of accessing previous versions of data objects is disclosed herein. The storage cluster includes multiple storage volumes stored in multiple cooperative storage nodes under a common namespace. The network storage cluster receives a namespace identifier for a previous version of a data object. The namespace identifier includes a namespace path containing a volume junction and a time indicator indicating a point in time when the previous version of the data object existed. The network storage cluster identifies a storage volume within the network storage cluster by using the volume junction. The volume junction points to a root directory of a file system of the storage volume. The network storage cluster locates, based on the namespace path, the previous version of the data object within a snapshot copy of the storage volume identified by the time indicator.

At least some embodiments of the present invention pertain to data storage clusters, and more particularly, to data storage clusters with volume snapshot capabilities.

Turning now to the figures, FIG. 1 is a block diagram illustrating an example of a storage cluster 100 including multiple storage nodes, whose storage volumes can form a single common namespace. The storage cluster 100 includes multiple storage nodes 110A, 110B and 110C. The storage nodes 110A, 110B and 110C can communicate with each other through an interconnect 120. The interconnect 120 may be, for example, a local area network (LAN), wide area network (WAN), metropolitan area network (MAN), global area network such as the Internet, a Fibre Channel fabric, or any combination of such interconnects. In some embodiments, the interconnect 120 can include a network switch for processing and routing data between the nodes under network protocols, including TCP/IP. Clients 130A and 130B may communicate with the storage cluster 100 via a network 140, which can be, for example, the Internet, a LAN, or any other type of network or combination of networks. Each of the clients may be various types of computing devices, for example, a conventional personal computer (PC), server-class computer, workstation, handheld computing/communication device, or the like. In some embodiments, the storage cluster is implemented using one or more racks of server computing devices, e.g., commodity-class servers.

Storage volumes of the storage cluster and their snapshot copies are distributed among the storage nodes. A storage volume (also referred to as volume) is a single accessible storage area with a single file system. For instance, the storage node 110A includes storage volumes 152 and 154. The storage node 110A further includes snapshot copies 152A, 152B of the storage volume 152 and snapshot copies 154A, 154B and 154C of the storage volume 154. Similarly, the storage node 110B includes storage volumes 156 and 158. The storage node 110B further includes snapshot copies 156A, 1568 of the storage volume 156 and snapshot copy 158A of the storage volume 158. The storage node 110C includes a storage volume 159 and snapshot copies 159A, 159B and 159C of the volume 159.

Figure 2:
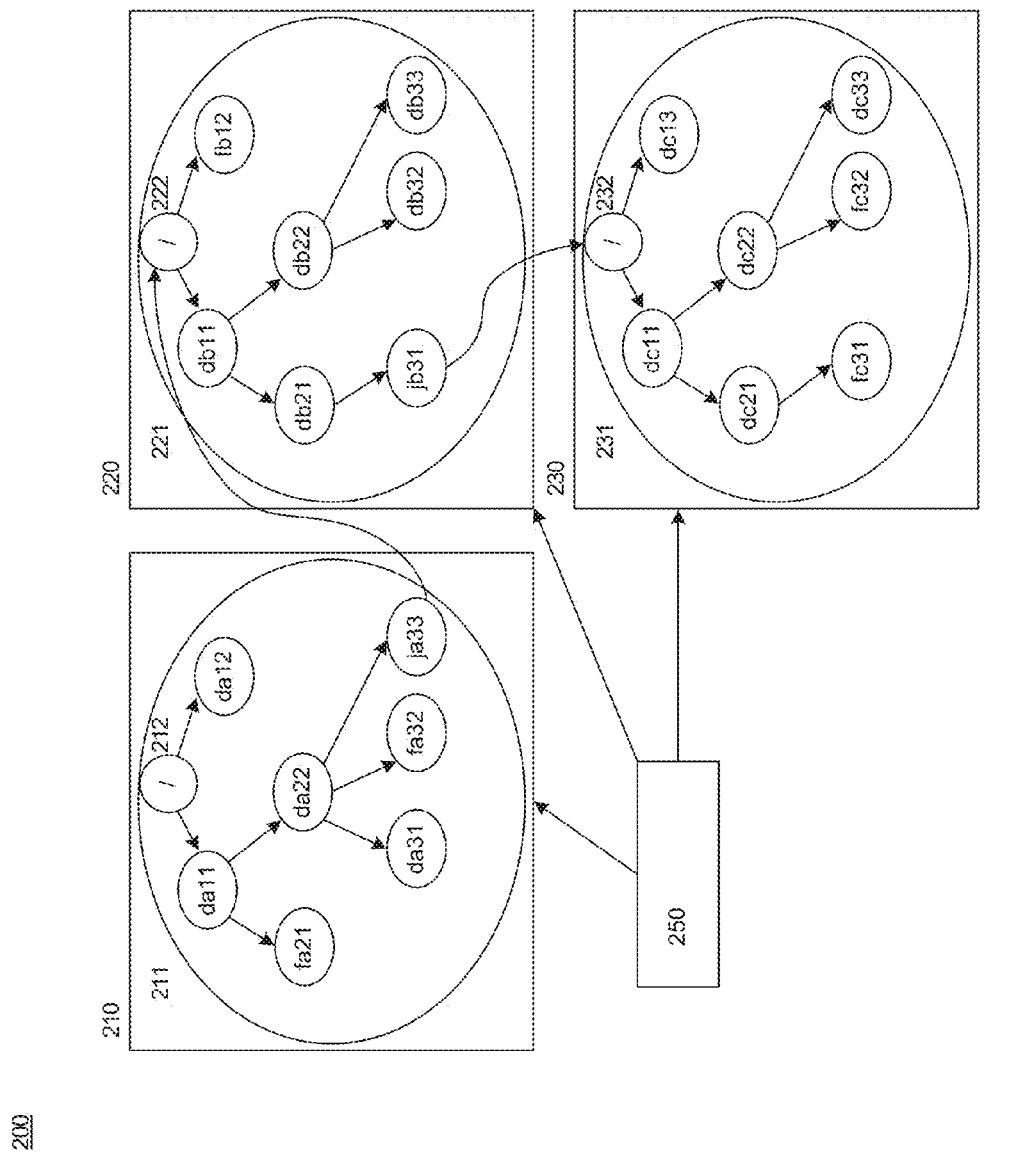
FIG. 2 is a block diagram illustrating an example of a storage system including multiple storage volumes that have a common namespace.

To access any data object within the storage cluster, the storage volumes form a common namespace. This technique applies to storage clusters having multiple nodes and single storage servers. FIG. 2 is a block diagram illustrating an example storage system 200 including multiple storage volumes that have a common namespace. The storage system 200 can be a storage cluster like the cluster 100 illustrated in FIG. 1, a single storage server, or a high-availability storage server pair. The storage system 200 includes multiple storage volumes 210, 220 and 230. Each storage volume (210, 220, and 230) includes a file system (211, 221, and 231). As explained in further detail below, the file systems 211, 221, and 231 of the storage volumes 210, 220, and 230 form a single common namespace via a volume junction mechanism, so that the storage system 200 can locate any version of a data object stored in any of the storage volumes via the common namespace.

Client devices, such as 130A and 130B in FIG. 1, can access or retrieve any version of a data object, by communicating with the storage system 200 under a file protocol utilizing the common namespace. Therefore from a client's perspective, the objects of the storage system are accessible in the single common namespace, regardless of whether the objects belong to different storage volumes of the storage system, or even different storage nodes of a storage cluster (e.g. the nodes 110A, 110B and 110C of cluster 100 in FIG. 1).

As illustrated in FIG. 2, the file system 211 of the storage volume 210 starts with a root directory 212, which is annotated with a slash mark ("/"). The root directory 212 includes directories da11 and da12. The directory da11 includes a file fa21 and a directory da22. The directory da22 includes a directory da31, a file fa32, and a volume junction ja33. A volume junction (also referred to as junction) is a data structure including a pointer to a root directory of a file system of another storage volume. As illustrated in FIG. 2, the volume junction ja33 points to a root directory 222 of the file system 221 of the storage volume 220.

Similarly, the file system 221 of the storage volume 220 starts with the root directory 222, which is also annotated with a slash mark. The root directory 222 includes a directory db11 and a file fb12. The directory db11 includes directories db21 and db22. The directory db22 includes directories db32 and db33. The directory db21 includes a volume junction jb31 pointing to a root directory 332 of the file system 231 of the storage volume 230.

The file system 231 of the storage volume 230 starts with the root directory 232, which is also annotated with a slash mark. The root directory 232 includes directories dc11 and dc13. The directory dc11 includes directories dc21 and dc22. The directory dc22 includes a file fc32 and a directory dc33. The directory dc21 includes a file fc31.

In one embodiment, the storage system 200 supports a network protocol called Server Message Block ("SMB"), also known as Common Internet File System ("CIFS"), for accessing and retrieving data objects. The storage system 200 can also support other network protocols or file protocols for accessing and retrieving data objects, as readily understood by a person having ordinary skill in the art.

A client device can refer to the file fc31 using a namespace identifier having the following namespace path:
/da11/da22/ja33/db11/db21/jb31/dc11/dc21/fc31.
The volume junction ja33 points to the root directory of the storage volume 220; the volume junction jb31 points to the root directory of the storage volume 230. Using the volume junction data structures ja33 and jb31, the file systems 211, 221 and 231 form a common namespace. Any data object in the storage system 200 can be located using a namespace identifier under the common namespace, similar to the namespace identifier of the file fc31.

The storage system 200 includes a namespace manager 250 (e.g. a CIFS stack) to resolve a namespace identifier to locate a data object of interest. In one embodiment, the namespace manager 250 relies on a file system 211 of a volume 210 to resolve the namespace identifier until encountering a volume junction ja33. The file system 211 sends a message regarding the volume junction ja33 to the namespace manager 250. The namespace manager 250 then looks up a volume junction data structure (e.g. table) for the information of the volume junction ja33. Once the namespace manager 250 determines the identity of the storage volume 220 that the volume junction ja33 points to, the namespace manger 250 relies on the file system 221 of the storage volume 220 to continue resolving the namespace identifier, until that storage volume 220 encounters another volume junction or end of the namespace identifier.

The common namespace and the namespace manager 250 support locating previous versions of objects in volume snapshot copies. Volume snapshot copies of a storage volume are point-in-time copies of the entire file system of the storage volume at specific times. Different storage volumes can have different snapshot policies that result in possibly different numbers of volume snapshot copies taken at different times. In one embodiment, the storage system 200 can provide a feature to the client devices that the client devices can see a list of different previous versions (and current versions) of a data object and choose to open and operate on a particular previous version of the data object.

Figure 3:
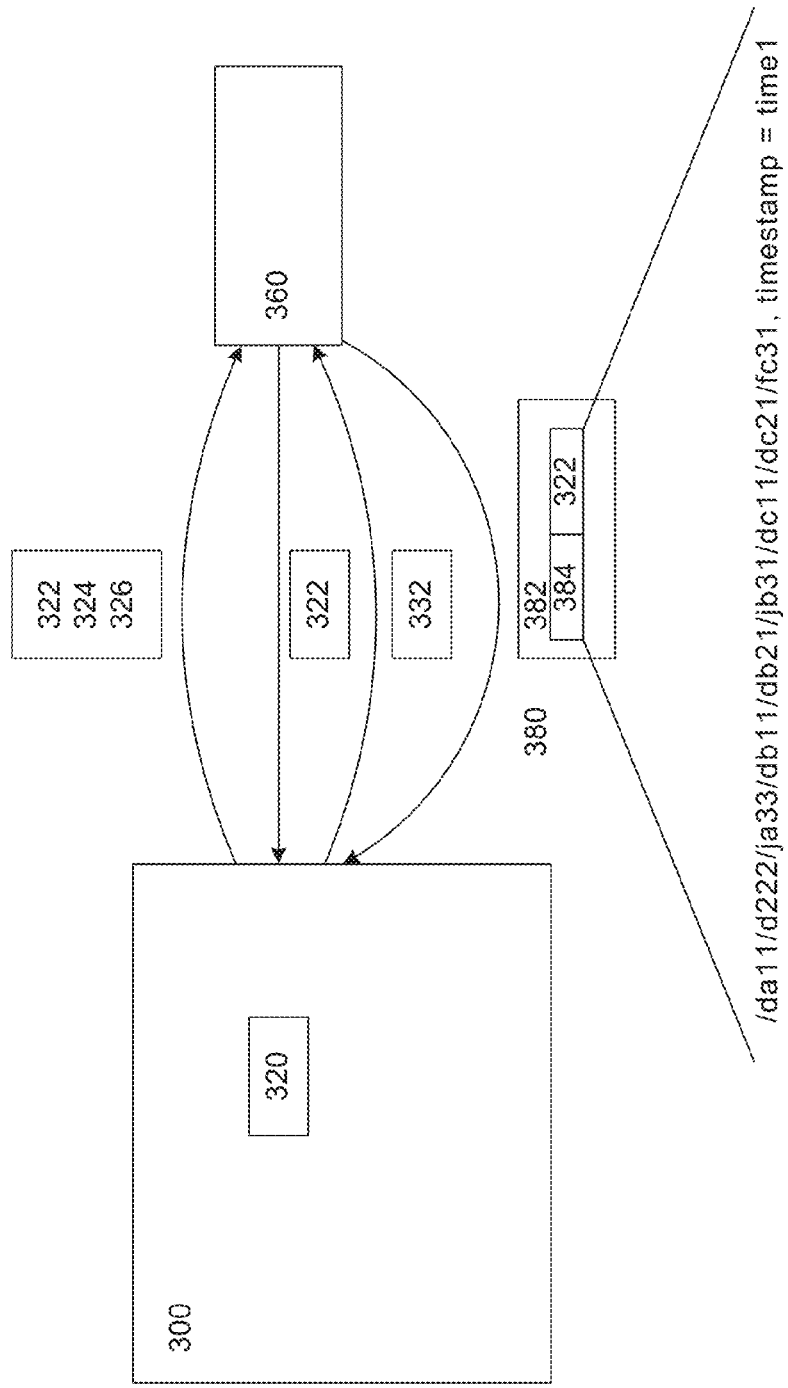
FIG. 3 is a block diagram illustrating an example of a storage system for presenting multiple previous versions of a data object to a client device.

FIG. 3 is a block diagram illustrating an example of a storage system 300 for presenting multiple previous versions of a data object to a client device. Through a network protocol, the storage system 300 can present multiple previous versions (322, 324 and 326) of a data object 320 to the client device 360. The client device 360 indicates to the storage system 300 that the previous version 322 is the version that the client device 360 is interested in. Accordingly, the storage system 300 sends the timestamp 332 of the version 322 to the client device 360. The client device 360 sends a protocol message 380 under a network protocol (e.g. the CIFS protocol) including a namespace identifier 382 to the storage system 300 for an operation (e.g. read, write, delete or create) on the version 322 of the data object 320. The namespace identifier 382 includes a namespace path 384 (which may includes volume junctions) and the timestamp 322 of the version 322 of the data object 320.

The storage system 300 can determine whether a client device is interested in operating on a previous version or a current version of a data object, by determining whether the received namespace identifier includes a timestamp. If the received namespace identifier includes a timestamp, the client device requests an operation on a previous version of the corresponding data object; otherwise, the client device requests an operation on a current version of the corresponding data object.

In one embodiment, the timestamp is inserted in the namespace path of the namespace identifier. An example of such a namespace identifier is: /da11/da22/ja33/@GMT-YYYY.MM.DD-HH.MM.SS/db11/db21/jb31/dc11/dc21/fc31, wherein the timestamp is presented in a format of "@GMT-YYYY.MM.DD-HH.MM.SS."

In another embodiment, the namespace identifier includes a field of the namespace path and another field of the timestamp. An example of such a namespace identifier is: /da11/da22/ja33/db11/db21/jb31/dc11/dc21/fc31, Timestamp=time1.

The namespace identifier can have other format to include the namespace path and the timestamp of a previous version of the object in interest, as readily understood by a person having ordinary skill in the art.

The storage system 300 is expected to perform an operation, according to the protocol message 380, on a previous version of a data object that existed at a point in time indicated by the timestamp. Using this mechanism, the client device can realize functionalities including restoring a previous version of a data object (e.g. a file or a directory), and browsing a file system as the file system existed at the time when a snapshot copy was taken.

To locate the correct version of a data object, the storage system 300 needs to locate a volume snapshot copy of a storage volume that includes the corresponding version of the data object. The data object may have been deleted or modified in the current active file system, but existed as a previous version at the time of taking a snapshot copy. To locate the corresponding storage volume and the corresponding snapshot copy, the storage system 300 needs to resolve the volume junctions in the namespace identifier.

Figure 4:
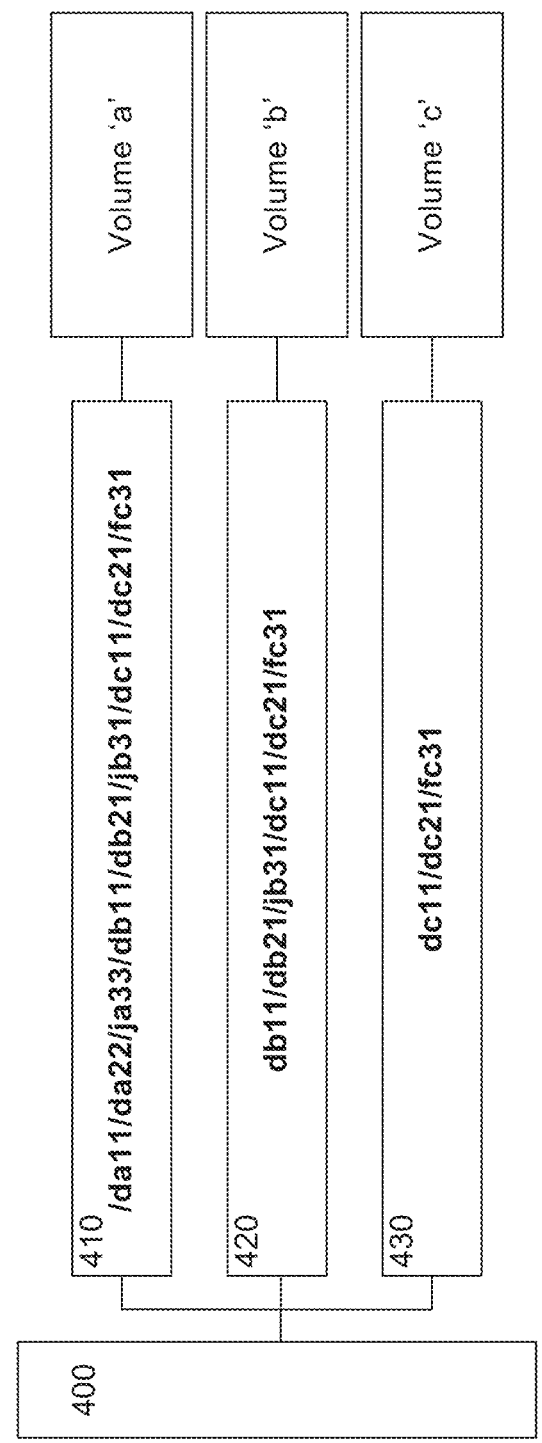
FIG. 4 is a block diagram illustrating an example of a process for resolving volume junctions in a namespace identifier.

FIG. 4 is a block diagram illustrating an example of a process for resolving volume junctions in a namespace identifier. For instance, a namespace identifier is received as: /da11/da22/ja33/@GMT-YYYY.MM.DD-HH.MM.SS/db11/db21/jb31/dc11/dc21/fc31, (or /da11/da22/ja33/db11/db21/jb31/dc11/dc21/fc31, timestamp=time1, where time1 is equivalent to GMT-YYYY.MM.DD-HH.MM.SS) is received, the protocol manager of the storage system removes the timestamp from the path, converts it to a local server time, prepares a TS timestamp component and append it to the namespace identifier at the end. The resulting namespace identifier is: /da11/da22/ja33/db11/db21/jb31/dc11/dc21/fc31/TS.

The TS component is a special component of the namespace identifier, called timestamp component, which embeds a local server time. The TS component is added as the last component to the path as it is to be applied on the last storage volume identified in the namespace identifier (via the last volume junction), that contains the previous versions of the data object of interest. By including TS component, the namespace identifier specifies that the interested version is inside the snapshot copy taken at time GMT-YYYY.MM.DD-HH.MM.SS, i.e. time1, instead of the current active file system.

FIG. 4 illustrates an example of a process for resolving volume junctions in a namespace identifier. As shown, a namespace manager 400 of the storage system receives a namespace identifier 410 to locate a previous version a data object of interest. The namespace manager determines a volume 'a' based on the first data object (i.e. the directory da11) of the namespace identifier 410. The namespace manager instructs the file system of the volume 'a' to resolve the namespace identifier until encountering a volume junction ja33. The file system of the volume 'a' sends a message regarding the volume junction ja33 to the namespace manager. The namespace manager then looks up a volume junction table that indicates the volume junction ja33 points to a root directory of a volume 'b'. Once the namespace manager determines the identity of the storage volume 'b' to which the volume junction ja33 points, then the namespace manger instructs a file system of the volume 'b' to continue resolving the remaining portion 420 of the namespace identifier 410, until the file system of the volume 'b' encounters another volume junction jb31.

Similarly, the namespace manager then looks up the volume junction table that indicates the volume junction jb31 points to a root directory of a volume 'c', and instructs a file system of the volume 'c' to continue resolving the remaining portion 430 of the namespace identifier 410. The namespace manager scans through the remaining portion 430 of the namespace identifier 410 (till the last TS component) to determine that it does not include any volume junction anymore. This indicates that the namespace manager has located the storage volume on which the object of interest of its previous versions reside. In case that the namespace identifier corresponds to a previous version of a deleted data object. The storage volume contains no current active version of the deleted data object but contains one or more previous versions of the data object in snapshot copies of the storage volume.

Once the corresponding volume is identified, the namespace manager determines the corresponding snapshot copy of the volume taken at the time indicated by the timestamp. In at least one other embodiment, the namespace manager identifies the corresponding snapshot copy by a snapshot copy ID or a snapshot copy name.

The namespace manager then looks up the identified volume snapshot copy starting from the root directory. Using the namespace path of the remaining portion 430 of the namespace identifier 410, the namespace manger resolves the file system structure within the identified snapshot copy based on the namespace path and locates the previous version of the data object in interest.

If the namespace manager encounters a volume junction inside the identified snapshot copy along the namespace path, this means that this namespace path does not have a volume junction in the current active file system, but included a volume junction when the snapshot copy was taken. Therefore the previous version of the object of interest did not exist on this volume when the snapshot copy was taken. Accordingly, the namespace manager returns an "entry not found" (e.g. "ENOENT") error to the client device.

A namespace path of a namespace identifier can include one or more symbolic links. A symbolic link is a special type of object that points to another data object (e.g. a file or a directory) in the file system of the same storage volume. In one embodiment, when encountering a symbolic link in a namespace identifier, the namespace manager can resolve the symbolic link itself by looking up a symbolic link information data structure. In another embodiment, the namespace manager can send the symbolic link information to the client device, which then resolves the symbolic link and sends back the corresponding path information to the namespace manager. Once the symbolic link is resolved and the resulting namespace path is generated, the namespace manager can resume resolving the rest of the namespace identifier.

If a symbolic link is encountered while resolving namespace path inside a snapshot copy, the namespace manager handle the symbolic link depending on whether the symbolic link is an absolute or relative symbolic link. An absolute symbolic link points to a data object in the active file system of the volume. Accordingly, the namespace manager resolves the absolute symbolic link by looking up the pointed data object in the active file system of the volume. Once the absolute symbolic link is resolved, the namespace manager uses the TS component again to enter the snapshot copy of interest and find the object of interest.

A relative symbolic link, in contrast, points to the data object in the snapshot copy. The namespace manager continues to resolve the relative symbolic link within the snapshot copy, and eventually locates the previous version of the object of interested in the snapshot copy.

To resolve the namespace identifier to locate the requested version of the data object, the namespace manager is able to handle different types of objects within the namespace identifier. An object in a namespace identifier can be a file, a directory, a symbolic link, a volume junction, or a timestamp component (e.g. TS component).

A storage system (e.g. a storage cluster or a storage server) may have snapshot policies for the storage volumes of the storage system. Each snapshot policy determines a frequency at which the storage system creates a snapshot copy for the volume. In other words, the time of the day when the snapshot copy is created is predetermined according to the snapshot policy. There is a possibility that different storage volumes that share the common namespace via volume junctions can have snapshot copies being created at the same time (or even have an identical snapshot policy).

When volumes have snapshot copies with the same timestamp, it is possible for the storage system to restore a portion of the common namespace, which may span across multiple volumes, to a previous point in time. For instance, a client device can send a request to restore a directory of the common namespace, wherein the directory or its sub-directories contains at least one volume junction pointing to another volume. The directory of the common namespace is identified by a namespace identifier including a timestamp. If the volume in which the directory resides and volumes designated by the volume junctions all have snapshot copies created at the same time indicated by the timestamp, the storage system can traverse all objects within the directory (including objects in different volumes) to restore the entire directory to a previous point in time.

In one embodiment, the storage system uses the current volume junction data structure to traverse the objects within the directory. In another embodiment, a volume junction within the directory may have been deleted or modified. The storage system can maintain previous versions of the volume junction data structure (e.g. junction copies) so that the storage system can use previous version of junctions to traverse the objects within the directory.

In the techniques disclosed herein, the namespace identifier can include a type of snapshot copy identification other than a snapshot copy time indicator (e.g. a timestamp). These techniques are also applicable in storage systems where previous versions of file systems (i.e. snapshot copies) can be identified in other ways (e.g. snapshot copy IDs or snapshot copy names). As long as there is a way to identify specific snapshot copy, a person having ordinary still in the art can readily apply or adapt the techniques disclosed here to access or operate upon objects using namespace identifiers including certain snapshot copy identifications.

Figure 5:
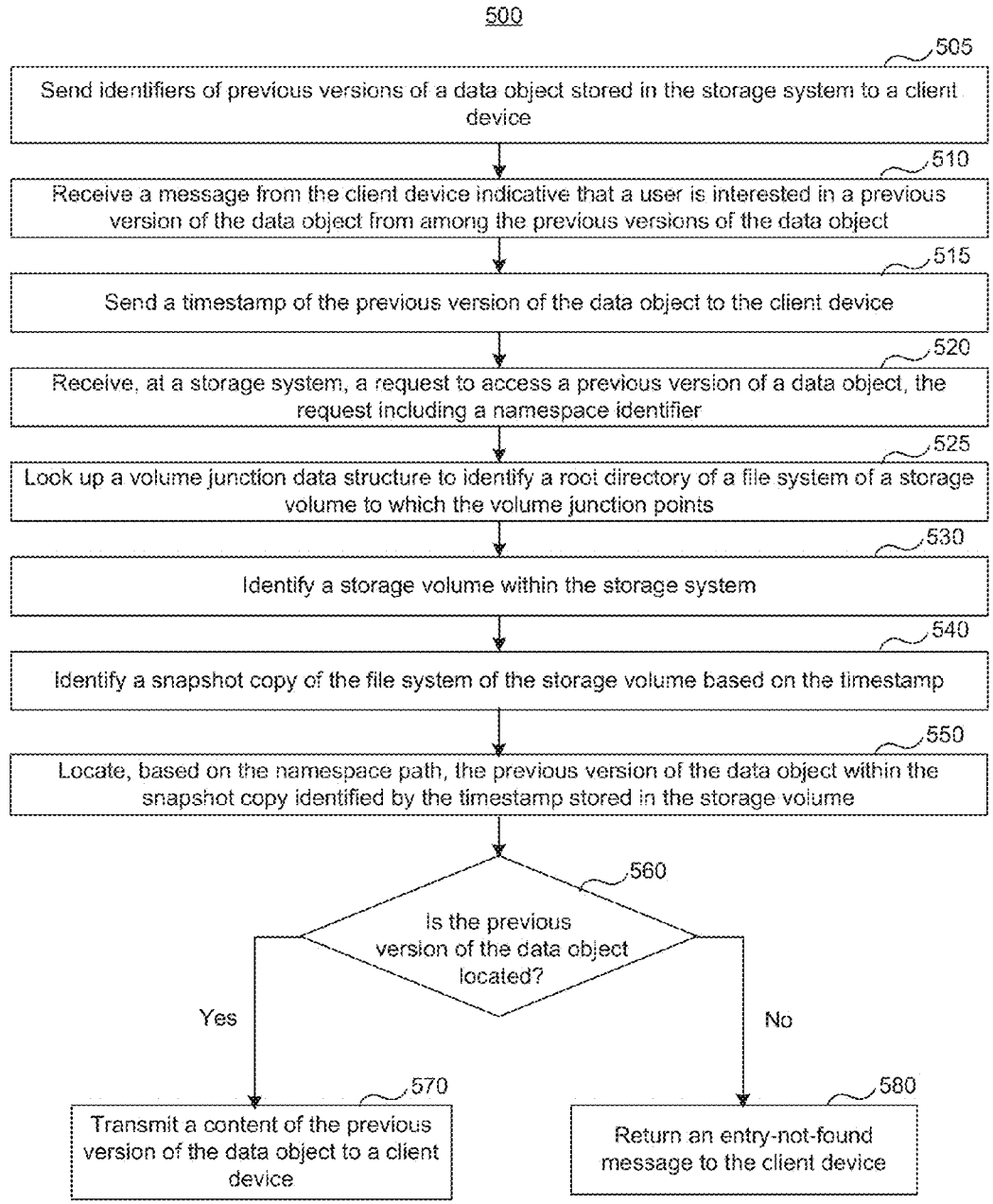
FIG. 5 is a flow diagram illustrating an example of a process for accessing previous versions of data objects within a storage system including multiple storage volumes under a common namespace.

FIG. 5 is a flow diagram illustrating an example of a process 500 for accessing previous versions of data objects within a storage system including multiple storage volumes under a common namespace. The storage system includes multiple storage volumes. At least one storage volume of the storage volumes contains a volume junction as an object within a root directory of a file system of that storage volume. The volume junction points to a root directory of a file system of another storage volume among the storage volumes. The file systems of the storage volumes form a common namespace by incorporating one or more volume junctions. In one embodiment, the storage system is a storage cluster including multiple storage nodes. Each of the storage volume is stored in one of storage nodes of the storage system. The data object can be a file, or a directory, or other type of data container.

At step 505 of the process 500, the storage system sends identifiers of previous versions of a data object stored in the storage system to a client device, in response to an inquiry from the client device for previous versions of the data object. At step 510, the storage system receives a message from the client device indicative that a user is interested in a particular previous version of the data object from among the previous versions of the data object. The message may indicate, for example, receipt at the client device of a user input selecting an item on the list. Optionally at step 515, the storage system sends a timestamp (or other form of time indicator) of the particular previous version of the data object to the client device.

At step 520, the storage system receives, at a storage system, a request to access a previous version of a data object, the request including a namespace identifier. The namespace identifier includes a namespace path containing a volume junction and a timestamp indicating a point in time when the previous version of the data object existed. The request can include different types of operations. For instance, the request can be an instruction to retrieve the content of the previous version of the data object, or an instruction to restore the previous version of the data object as a current version of the data object in the storage system.

At step 525, the storage system looks up a volume junction data structure to identify a root directory of a file system of a storage volume to which the volume junction points. At step 530, the storage system identifies a storage volume within the storage system to which the volume junction points. The volume junction points to the root directory of the file system of the storage volume.

At step 540, the storage system further identifies a snapshot copy of the file system of the storage volume based on the timestamp. The snapshot copy was created at a time of point indicated by the timestamp. At step 550, the storage system locates, based on the namespace path, the previous version of the data object within the snapshot copy identified by the timestamp.

At step 560, the storage system determines whether the previous version of the data object is located. If so, depending on the type of the client request, the storage system can continue to transmit content of the previous version of the data object to a client device at step 570, as illustrated in FIG. 5. Or in another embodiment, the storage system restores, at the storage volume, the previous version of the data object as a current version of the data object. If the previous version of the data object does not exist in the identified snapshot copy, the storage system returns an entry-not-found message to the client device at step 580.

Figure 6:
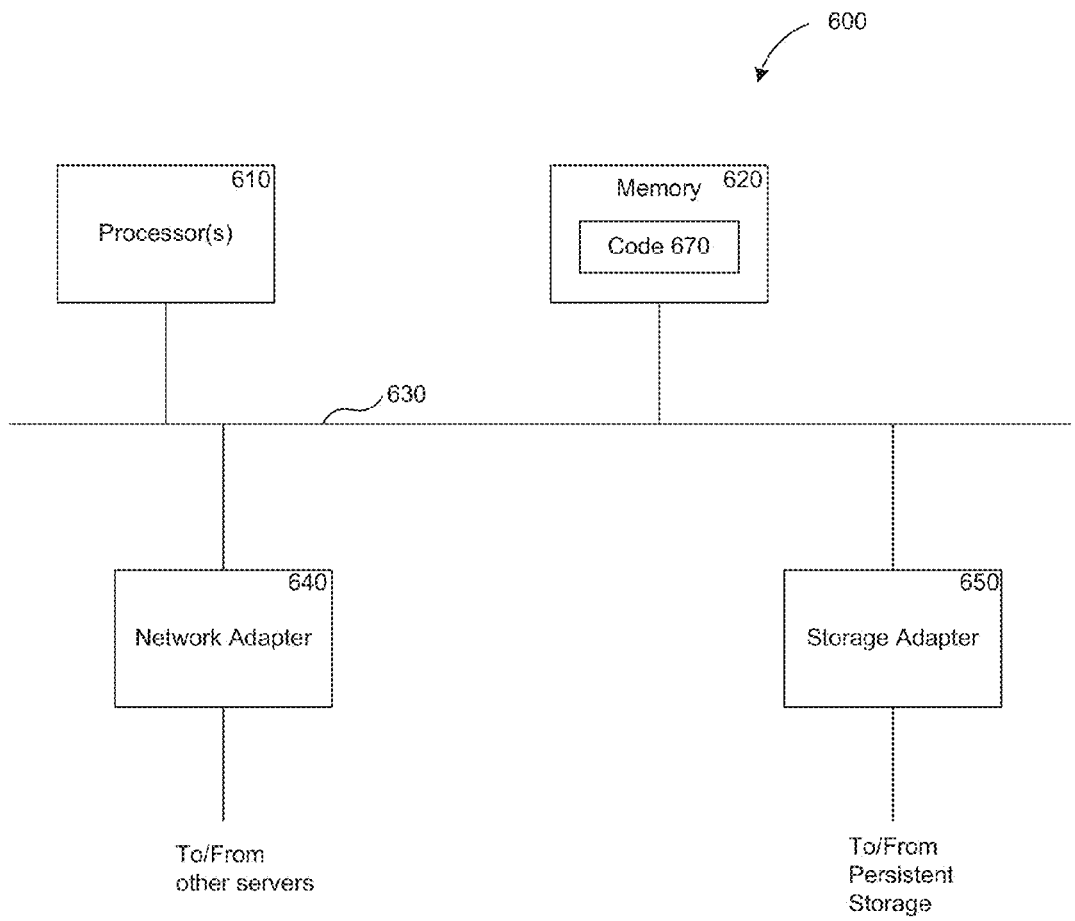
FIG. 6 is a high-level block diagram illustrating an example of the architecture of a processing system, which may represent a storage node or a storage server described herein.

FIG. 6 is a high-level block diagram illustrating an example of the architecture of a processing system, which may represent any storage node or storage server mentioned herein. The processing system 600 includes one or more processors 610 and memory 620 coupled to an interconnect 630. The interconnect 630 shown in the FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the processing system 600 and, thus, control the overall operation of the processing system 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the processing system 600. The memory 620 represents any form of random access memory (RAM), read-only memory (ROM), flash memory, or the like, or a combination of such devices. In use, the memory 620 may contain a code 670 containing instructions according to the techniques disclosed herein.

Also connected to the processor(s) 610 through the interconnect 630 are a network adapter 640 and a storage adapter 650. The network adapter 640 provides the node 600 with the ability to communicate with remote devices, over a network and may be, for example, an Ethernet adapter or Fibre Channel adapter. The network adapter 640 may also provide the node 600 with the ability to communicate with other nodes within the cluster. In some embodiments, a node may use more than one network adapter to deal with the communications within and outside of the cluster separately. The storage adapter 650 allows the node 600 to access a persistent storage, and may be, for example, a Fibre Channel adapter or SCSI adapter.

The code 670 stored in memory 620 may be implemented as software and/or firmware to enable the processor(s) 610 to carry out actions described above. In certain embodiments, such software or firmware may be initially provided to the processing system 600 by downloading it from a remote system through the node 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method, comprising:
receiving, at a network storage cluster that includes multiple cooperative storage nodes and multiple storage volumes, a namespace identifier for a previous version of a data object, wherein the namespace identifier includes a namespace path containing a volume junction and a time indicator indicating a point in time when the previous version of the data object existed, wherein a first storage volume at a first node contains the identified volume junction as a sub-directory within a first root directory of a first file system of the first storage volume, wherein the volume junction points to a second root directory of a second file system of a second storage volume at a second node;
identifying, by a processor, the second storage volume within the network storage cluster by using the volume junction identified by the namespace identifier, wherein identifying the second storage volume within the network storage cluster by using the volume junction identified by the namespace identifier comprises:
determining, by the first file system, that the namespace path to the first file system of the first node includes a first portion identifying a first path with multiple sub-directories in the first file system and that the path includes the volume junction followed by a second portion identifying a second path with multiple sub-directories that are not in the first file system,
determining, by the second file system, that the second path includes multiple sub-directories in the second file system, and
selecting, by a namespace manager of the network storage cluster, the second storage volume based on the second portion of the namespace path lacking any volume junctions and the second file system manager determining that the second path includes multiple sub-directories in the second file system; and locating, by the processor based on the second volume identified from the volume junction in the namespace path, the previous version of the data object within a snapshot copy of the second storage volume, wherein the snapshot copy is identified using the time indicator in the namespace identifier.

2. The method of claim 1, wherein file systems of the storage volumes form a common namespace by including one or more volume junctions.

3. The method of claim 1, wherein locating the previous version of the data object comprises
identifying the snapshot copy of the second file system of the second storage volume based on the time indicator, wherein the snapshot copy of the second file system includes the snapshot copy of the data object and was created at a point in time indicated by the time indicator.

4. The method of claim 1, further comprising, prior to receiving the namespace identifier:
sending identifiers of previous versions of the data object to a client device;
receiving a message from the client device indicating a selection of one or more of the identifiers; and
sending the time indicator to the client device in response to receiving the message.

5. The method of claim 1, further comprising:
transmitting content of the previous version of the data object to a client device.

6. The method of claim 1, further comprising:
accessing a mapping of volume junctions to root directories; and
identifying the second root directory from the accessed mapping.

7. The method of claim 1, further comprising:
determining that a portion of the namespace path referencing a storage volume from the first or second storage volumes includes a symbolic link to an additional data object with the storage volume; and
replacing the symbolic link within the namespace path with the additional data object to which the symbolic link points.

8. The method of claim 1, wherein the data object is a file or a directory.

9. The method of claim 1, wherein identifying the second storage volume within the network storage cluster by using the volume junction identified by the namespace identifier comprises:
wherein a namespace manager of the network storage cluster provides the namespace path to the first file system of the first node;
wherein the first file system provides a message to the namespace manager indicating that the volume junction points to the second root directory of the second file system;
wherein the namespace manager provides, based on receiving the message, the second portion with the second path to the second file system of the second node;
wherein the network storage cluster is independent of a client system from which a request to access the previous version of the data object is received.

10. A non-transitory machine-readable medium having stored thereon machine-executable code that, when executed by one or more machines, causes the one or more machines to:
receive, at a network storage cluster that includes multiple cooperative storage nodes and multiple storage volumes, a namespace identifier for a previous version of a data object, wherein the namespace identifier includes a namespace path containing a volume junction and a time indicator indicating a point in time when the previous version of the data object existed, wherein a first storage volume at a first node contains the volume junction identified by the namespace identifier as a sub-directory within a first root directory of a first file system of the first storage volume, wherein the volume junction points to a second root directory of a second file system of a second storage volume at a second node;
identify the second storage volume within the network storage cluster by using the volume junction identified by the namespace identifier, wherein the machine-executable code, when executed by the one or more machines, causes the one or more machines to identify the second storage volume by performing operations comprising:
determining, by the first file system, that the namespace path to the first file system of the first node includes a first portion identifying a first path with multiple sub-directories in the first file system and that the path includes the volume junction followed by a second portion identifying a second path with multiple sub-directories that are not in the first file system,
determining, by the second file system, that the second path includes multiple sub-directories in the second file system, and
selecting, by a namespace manager of the network storage cluster, the second storage volume based on the second portion of the namespace path lacking any volume junctions and the second file system manager determining that the second path includes multiple sub-directories in the second file system; and
locate, based on the identified volume junction in the namespace path, the previous version of the data object within a snapshot copy of the second storage volume, wherein the snapshot copy is identified using the time indicator in the namespace identifier.

11. The non-transitory machine-readable medium of claim 10, wherein file systems of the storage volumes form a common namespace by including one or more volume junctions.

12. The non-transitory machine-readable medium of claim 10, wherein the machine-executable code for locating the previous version of the data object comprises machine-executable code that, when executed by the one or more machines, causes the one or more machines to identify the snapshot copy of the second file system of the second storage volume based on the time indicator, wherein the snapshot copy of the second file system includes the snapshot copy of the data object and was created at a point in time indicated by the time indicator.

13. The non-transitory machine-readable medium of claim 10, further comprising additional machine-executable code that, when executed by the one or more machines, causes the one or more machines to, prior to receiving the namespace identifier:
send identifiers of previous versions of the data object to a client device;
receive a message from the client device indicating a selection of one or more of the identifiers; and
send the time indicator to the client device in response to receiving the message.

14. The non-transitory machine-readable medium of claim 10, further comprising additional machine-executable code that, when executed by the one or more machines, causes the one or more machines to:
access a mapping of volume junctions to root directories; and identify the second root directory from the accessed mapping.

15. The non-transitory machine-readable medium of claim 10, further comprising additional machine-executable code that, when executed by the one or more machines, causes the one or more machines to:
determine that a portion of the namespace path referencing a storage volume from the first or second storage volumes includes a symbolic link to an additional data object with the storage volume; and
replace the symbolic link within the namespace path with the additional data object to which the symbolic link points.

16. A computing device comprising:
a memory containing machine readable medium storing machine-executable code for performing a method; and
a processor communicatively coupled to the memory, the processor configured to execute the machine-executable code to cause the processor to:
receive, at a network storage cluster that includes multiple cooperative storage nodes and multiple storage volumes, a namespace identifier for a previous version of a data object, wherein the namespace identifier includes a namespace path containing a volume junction and a time indicator indicating a point in time when the previous version of the data object existed, wherein a first storage volume at a first node contains the volume junction identified by the namespace identifier as a sub-directory within a first root directory of a first file system of the first storage volume, wherein the volume junction points to a second root directory of a second file system of a second storage volume at a second node;
identify the second storage volume within the network storage cluster by using the volume junction identified by the namespace identifier, wherein the processor is configured to identify the second storage volume by performing operations comprising:
determining, by the first file system, that the namespace path to the first file system of the first node includes a first portion identifying a first path with multiple sub-directories in the first file system and that the path includes the volume junction followed by a second portion identifying a second path with multiple sub-directories that are not in the first file system,
determining, by the second file system, that the second path includes multiple sub-directories in the second file system, and
selecting, by a namespace manager of the network storage cluster, the second storage volume based on the second portion of the namespace path lacking any volume junctions and the second file system manager determining that the second path includes multiple sub-directories in the second file system; and
locate, based on the identified volume junction in the namespace path, the previous version of the data object within a snapshot copy of the second storage volume, wherein the snapshot copy is identified using the time indicator in the namespace identifier.

17. The computing device of claim 16, wherein file systems of the storage volumes form a common namespace by including one or more volume junctions.

18. The computing device of claim 16, wherein the processor is configured to locate the previous version of the data object by executing machine-executable code to cause the processor to identify the snapshot copy of the second file system of the second storage volume based on the time indicator, wherein the snapshot copy of the second file system includes the snapshot copy of the data object and was created at a point in time indicated by the time indicator.

19. The computing device of claim 16, wherein the processor is further configured to execute additional machine-executable code to cause the processor to, prior to receiving the namespace identifier:
send identifiers of previous versions of the data object to a client device;
receive a message from the client device indicating a selection of one or more of the identifiers; and
send the time indicator to the client device in response to receiving the message.

20. The computing device of claim 16, wherein the processor is further configured to execute additional machine-executable code to cause the processor to:
access a mapping of volume junctions to root directories; and
identify the second root directory from the accessed mapping.

* * * * *